United States Patent [19]

Nakamura et al.

[11] Patent Number: 5,655,162

[45] Date of Patent: Aug. 5, 1997

[54] FILM FEEDING DEVICE OF A CAMERA

[75] Inventors: Toshiyuki Nakamura; Youichi Yamazaki, both of Tokyo, Japan

[73] Assignee: Nikon Corporation, Tokyo, Japan

[21] Appl. No.: 702,051

[22] Filed: Aug. 23, 1996

[30] Foreign Application Priority Data

Sep. 7, 1995 [JP] Japan ................................. 7-230083

[51] Int. Cl.$^6$ ............................... G03B 1/66; G03B 7/00
[52] U.S. Cl. ............................................. 396/284; 396/210
[58] Field of Search ................................. 396/292, 406, 396/284, 857, 409, 410, 210

[56] References Cited

U.S. PATENT DOCUMENTS

| | | | |
|---|---|---|---|
| 4,312,581 | 1/1982 | Miyagawa et al. | 354/106 |
| 4,579,432 | 4/1986 | Kobayashi | 354/21 |
| 4,728,976 | 3/1988 | Takahashi et al. | 354/173.11 |
| 5,032,858 | 7/1991 | Kobayashi et al. | 354/173.1 |
| 5,107,290 | 4/1992 | Ohsawa | 354/173.1 |

*Primary Examiner*—Safet Metjahic
*Assistant Examiner*—Eric Nelson
*Attorney, Agent, or Firm*—Oliff & Berridge

[57] ABSTRACT

A film feeding device of a camera includes a film feeding mechanism which has an initial winding mode to feed film mounted in the camera and wind a first frame to a shooting position, a first frame winding mode to wind the film by one frame subsequent to shooting, a manual rewinding mode to rewind the film into a film cartridge when a rewinding operation member is operated, and an automatic rewinding mode to rewind the film into the cartridge when the film is rewound through the final edge during rewinding of the film by one frame. A frame number counting mechanism counts a number of shootable frames remaining each time one frame is wound, and counts a number of frames remaining to be rewound each time one frame is rewound. An initial value setting mechanism sets a total number of frames of film as an initial value of the number of shootable frames remaining for the frame number counting mechanism subsequent to initial winding, and sets concurrently the number of frames already shot as the initial value of a number of frames remaining to be rewound for the frame number counting mechanism prior to rewinding. A display displays the frame number counted by the frame number counting mechanism. The initial value setting mechanism computes the number of frames already shot using different methods for the manual rewinding mode and for the automatic rewinding mode.

12 Claims, 11 Drawing Sheets

DIRECTION OF FILM WINDING

FILM FEEDING DEVICE OF A CAMERA

BACKGROUND OF THE INVENTION

1. Field of the Invention

The present invention relates to a film feeding device of a camera.

2. Description of Related Art

A conventional camera includes a film feeding device having an automatic rewinding mode. The automatic rewinding mode automatically rewinds the film upon detecting a final edge of the film when one frame is wound after shooting. Conventional film feeding devices also have a manual rewinding mode to rewind the film when a rewind button is operated.

A total frame number of the film is set in a film counter when the film is mounted in the camera. The film counter counts down each time one frame is wound after shooting. A number of remaining shootable frames is displayed concurrently. A number of frames already shot is set in the film counter prior to rewinding. The film counter is reduced by one each time one frame is rewound. The number of frames remaining to be rewound is displayed.

The number of frames obtained by subtracting the number of shootable frames remaining in the film counter when rewinding starts from the total number of frames of film is set as the number of frames already shot prior to when rewinding starts.

In the automatic rewinding mode, a frame is not wound after shooting the last frame. After shooting the last frame, the camera detects the final edge and automatically rewinds the film. Therefore, the problem arises that the number of remaining shootable frames in the film counter prior to when automatic rewinding starts remains one. A discrepancy is therefore created since the number of actual remaining shootable frames is zero. Therefore, calculating the number of frames already shot by subtracting the number of remaining shootable frames from the total number of frames prior to automatic rewinding results in a computation of the number of frames already shot, i.e., the number of the frames to be rewound, which is one less than the actual number.

However, in the manual rewinding mode, rewinding starts after a frame is wound, and the next frame to be shot is set at a predetermined shooting position. Therefore, the number of shootable frames remaining in the film counter coincides with the actual number of shootable frames remaining prior to when manual rewinding starts. Thus, calculating the number of frames already shot by subtracting the number of remaining shootable frames from the total number of frames prior to manual rewinding results in a computation of the correct number of frames shot, i.e., the number of frames remaining to be rewound.

SUMMARY OF THE INVENTION

It is therefore an object of the present invention to provide a film feeding device for a camera which accurately displays the number of remaining frames to be rewound during rewinding of the film.

A film feeding device of a camera in accordance with the present invention has a film feeding mechanism. The film feeding mechanism has an initial winding mode to feed film mounted in the camera and to wind the first frame of film to the shooting position. A first frame winding mode winds one frame of the film after shooting. A manual rewinding mode rewinds the film into a film cartridge when a rewinding operation member is operated. An automatic rewinding mode rewinds the film into the cartridge when the film is rewound past a final edge of the film. A frame number counting mechanism counts the number of shootable frames remaining each time one frame is wound. The frame number counting mechanism counts the number of frames remaining to be rewound every time one frame is rewound. An initial value setting mechanism sets the total number of frames of film as an initial value of the number of shootable frames remaining by the frame number counting mechanism after initial winding of the film. The initial value setting mechanism also sets, at the same time, the number of frames already shot as an initial value of the number of frames remaining to be rewound for the frame number counting mechanism prior to rewinding of the film. A display displays the frame number counted by the frame number counting mechanism. The initial value setting mechanism computes the number of frames already shot using a different method for the manual rewinding mode than for the automatic rewinding mode.

After initial winding, the total number of frames of film is set as an initial value of the number of shootable frames remaining. The number of shootable frames remaining is counted and displayed every time one frame is wound after being shot. The number of frames already shot is computed using a different method for the manual rewinding mode than for the automatic rewinding mode. The calculated number of frames already shot is set as an initial value of the number of frames remaining to be rewound prior to rewinding. The number of frames remaining to be rewound is counted and displayed each time one frame is rewound.

An initial value setting mechanism sets a value obtained by adding one to the difference between the number of shootable frames remaining that is counted by the frame number counting mechanism and the total number of frames of film as the number of frames already shot prior to rewinding via the automatic rewinding mode.

Prior to rewinding via the automatic rewinding mode, the value obtained by adding one to the difference between the number of shootable frames remaining and the total number of frames of film is set as the number of frames already shot. The calculated number of frames already shot is set as the initial value of the number of frames remaining to be rewound. The number of frames remaining to be rewound is counted and displayed each time one frame is rewound via the automatic rewinding mode.

The initial value setting mechanism sets the value obtained by subtracting the number of shootable frames remaining counted by the frame counting mechanism from the total number of frames of film as the number of frames already shot prior to rewinding by the manual rewinding mode.

Prior to rewinding by the manual rewinding mode, the value obtained by subtracting the number of shootable frames remaining from the total number of frames of film is set as the number of frames already shot. The calculated number of frames already shot is set as the initial value of the number of the frames to be rewound. The number of frames remaining to be rewound is counted and displayed each time one frame is rewound by the manual rewinding mode.

A film feeding mechanism in accordance with another embodiment of the invention has an initial winding mode to feed film mounted in the camera and to wind the first frame to the shooting position. A first frame winding mode winds the film one frame after shooting. A manual rewinding mode rewinds the film into the film cartridge when a rewinding operation member is operated. An automatic rewinding mode rewinds the film into the cartridge by rewinding one frame of the film past a final edge. A frame number counting mechanism counts the number of shootable frames remaining each time one frame begins to be wound. The frame number counting mechanism also counts the number of frames remaining to be rewound each time one frame is rewound. An initial value setting mechanism sets the total number of frames of film as the initial value of the number of shootable frames remaining for the frame number counting mechanism after initial winding. The initial value setting mechanism concurrently sets the number of frames already shot as the initial value of the number of frames remaining to be rewound for the frame number counting mechanism prior to rewinding. A display displays the frame number counted by the frame number counting mechanism. The initial value setting mechanism sets the number obtained by subtracting the number of remaining shootable frames counted by the frame number counting mechanism from the total number of frames of film as the number of frames already shot prior to rewinding via either the manual or automatic rewind mode.

After initial winding, the total number of frames of film is set as the initial value of the number of shootable frames remaining. The number of shootable frames remaining is counted and displayed each time one frame begins to be wound after shooting. The number of frames already shot is calculated by subtracting the number of shootable frames remaining from the total number of frames of the film. The calculated number of frames already shot is set as the initial value of the number of frames remaining to be rewound prior to rewinding via either the manual or automatic rewinding mode. The number of frames remaining to be rewound is counted and displayed each time one frame is rewound.

Further objects, details and advantages of the invention will be apparent from the following detailed description, when read in conjunction with the drawings.

DETAILED DESCRIPTION OF PREFERRED EMBODIMENTS

Figure 1:
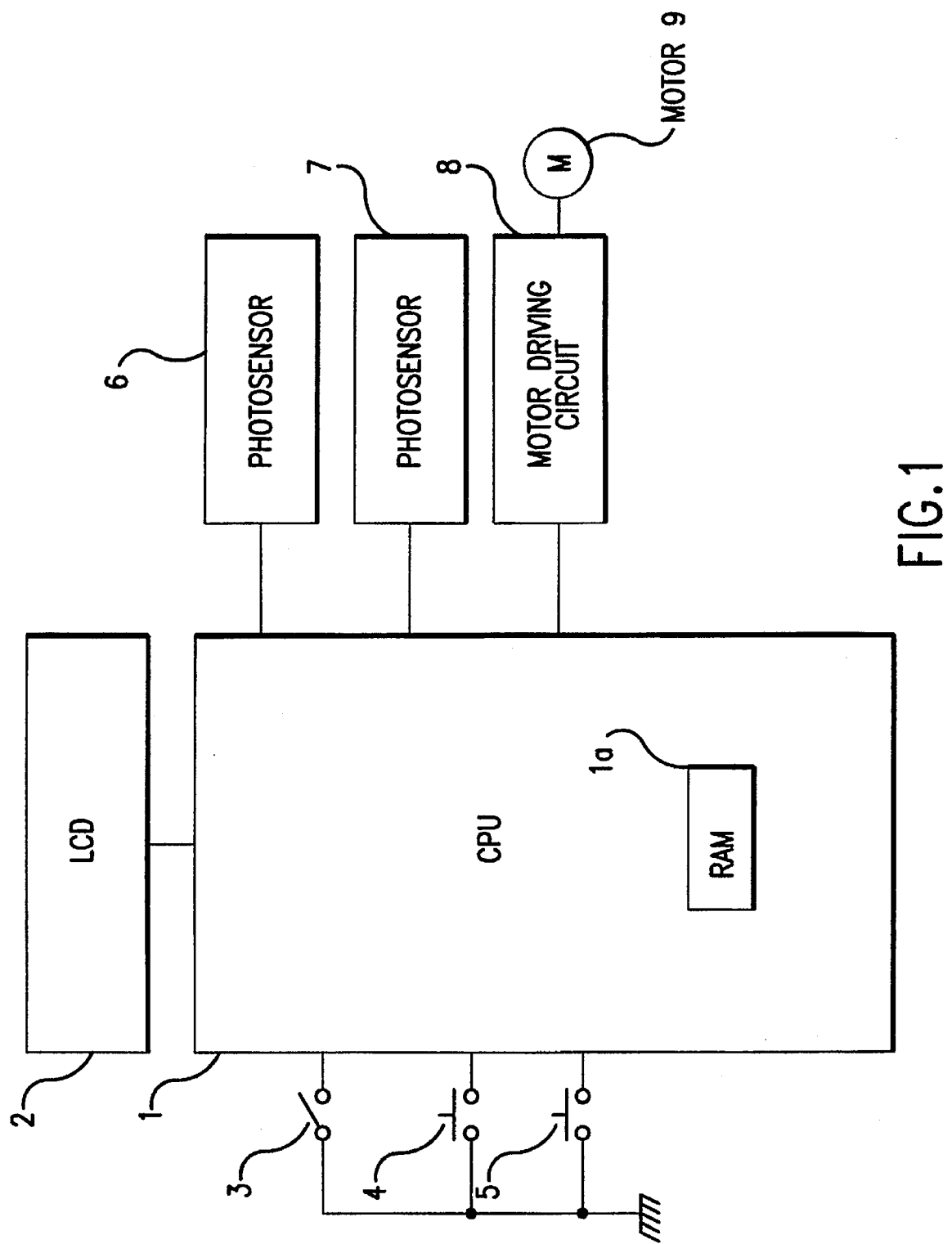
FIG. 1 is a block diagram showing a film feeding device of an embodiment of the present invention.

FIG. 1 is a block diagram showing a film feeding device of an embodiment of the present invention.

CPU 1 is a one-chip microcomputer. The CPU 1 includes a RAM 1a, a counter (not shown), a timer, an A/D converter and other peripherals. The CPU 1 executes control programs, as described below, to feed the film and to perform sequence control as well as various algorithms. An LCD 2, a cartridge chamber lid switch 3, a release switch 4, a rewinding switch 5, a photosensor 6, a photosensor 7 and a motor driving circuit 8 are connected to the CPU 1.

LCD 2 is a liquid crystal display unit. The LCD 2 displays various information such as the number of frames. The number of shootable frames remaining is displayed during shooting. Thus, during initial winding (hereinafter "thrust") wherein the film is fed from the cartridge, and after the first frame is fed to a predetermined shooting position, the total number of frames of film is displayed as the initial value of the number of shootable frames remaining. This value is then decreased by one each time one frame is wound. LCD 2 displays the number of frames to be rewound during rewinding. Thus, the number of frames already shot is displayed as the initial value of the number of frames remaining to be rewound prior to rewinding, which is then decreased by one each time one frame is rewound.

The cartridge chamber lid switch 3 is closed when the lid of the cartridge chamber is open. Conversely, the cartridge chamber lid switch 3 is open when the lid is closed. The release switch 4 is closed when the release button (not shown) is pressed. The release switch 4 executes a series of shooting operations by controlling a photometric circuit (not shown), a distance measuring circuit, a shutter driving circuit and similar mechanisms. The rewinding switch 5 is closed when a manual rewinding button (not shown) is pressed.

Photosensors 6 and 7 are photoreflectors that include a light emitting/light receiving unit to optically detect perforations of the film. Photosensors 6 and 7 are disposed at locations where perforations of the film pass. A reflection plate is attached to a film rail surface facing photosensors 6 and 7. When the film is disposed between photosensors 6, 7 and the rail surface, light rays from the light emitting unit are shielded by the film. Thus, the light rays are not reflected and do not enter the light emitting unit. However, when film is not disposed between photosensors 6, 7 and the rail surface, such as when the perforation holes occupy this position, the light rays from the light emitting unit are reflected by the reflection plate and enter the light emitting unit. The outputs from photosensors 6 and 7 are analog voltage. The output voltage increases as the amount of light received increases.

The motor driving circuit 8 drives and controls the motor 9 in the normal direction or in the reverse direction based upon driving commands received from CPU 1. Rotation of the motor 9 is transmitted to the film spool of the cartridge and the winding spool of the camera through a feeding mechanism (not shown). Rotation of the motor 9 thus performs the thrust, winding and rewinding of the film. The direction of normal rotation of the film corresponds to the direction of thrust and winding of the film. The direction of reverse rotation corresponds to the direction of rewinding of the film. The motor 9 is controlled by shorting both edges of the motor 9 while the film is not in the process of feeding.

The film cartridge is described below.

A conventional film cartridge is shaped such that a part of a leading section of the film protruder from the cartridge like a tongue. A film cartridge without a tongue, or a cartridge where the film is completely housed inside of the cartridge, is disclosed in Japanese Laid-Open Patent Publication No. 5-313234.

The tongueless or drop-in loading type film cartridge (hereinafter "tongueless film cartridge") has the following merits over conventional tongued film cartridges.

(1) Film is completely housed inside of the cartridge and is tongueless when the cartridge itself is handled.

(2) Data concerning the film, such as the number of frames, is stored. A data disk may be provided to display the status of the film such as unexposed, exposed, developed and similar conditions.

(3) The number and position of the perforations are defined for the shooting frame.

Figure 11:
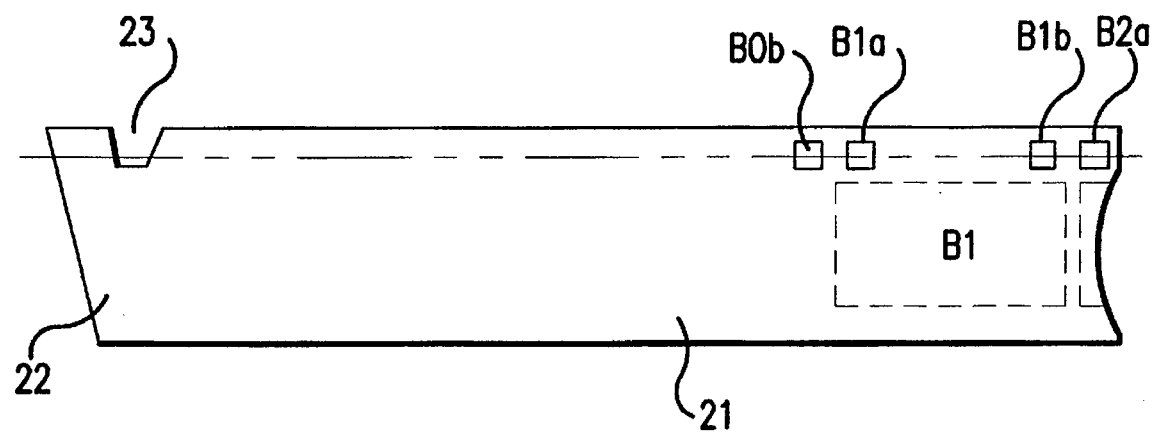
FIG. 11 is a diagram showing a leading section of tongueless film.

FIG. 11 is a diagram showing the leading section of the film housed in a tongueless film cartridge.

On one side of the film 21, two sets of perforations B1a, B1b, B2a, ... are formed at the front edge and the rear edge of each shooting frame. The positional relationship between the shooting frame and the perforation is the same relative to each shooting frame. An extra perforation B0b is formed in the leading side of the perforation B1a, which includes the front edge of the first shooting frame B1. The perforations B0b, B1a, B1b, ... are detected by photosensors 6 and 7. A notch 23 is formed in the leading section 22 of the film 21.

A data disk (not shown), on which information such as the number of total frames of film 21 is recorded, and a light lock door (hereinafter "LL door") which opens and closes based upon the need to shield light from the exit of the film 21, are provided in the film cartridge. Data is recorded on the data disk with black and white bar codes. The black and white bar codes are retrieved by reading the reversal interval time of the output signals from the sensor, such as the photoreflector, when the data disk rotates as the film 21 is fed. The static position of the data disk is determined based upon usage of the film 21. The data disk is set at various static positions according to conditions based upon usage, such as unexposed, exposed and developed. Thus, it is possible to detect the state of the film based upon the output signals of the sensor when the data disk is rotated immediately after the film cartridge is mounted on the camera. The static position of the data disk is made visible to a user by a member that rotates integrally with the data disk and a spool. Thus, the state of the film is easily realized.

Figure 12:
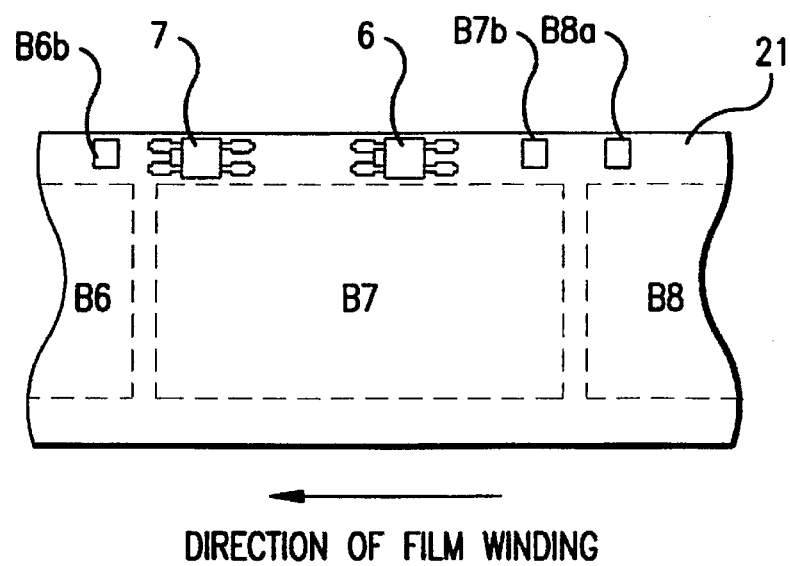
FIG. 12 is a diagram showing the positional relationship between photosensors and the film.

FIG. 12 shows the positional relationship of photosensors 6 and 7.

FIG. 12 shows a shooting frame B7 on the film 21 in the shooting position. The direction of winding of the film is to the left. The film cartridge is on the right and the leading section 22 of the film 21 is on the right. Photosensor 6 is disposed on the cartridge side. Photosensor 7 is disposed on the winding spool side of the camera. Thus, photosensor 6 detects a perforation before photosensor 7 when the film 21 is being wound.

Regarding the two perforations for each shooting frame, the perforation on the cartridge side is referred to as the first perforation, and the perforation on the leading side is referred to as the second perforation. The edge of the first perforation on the leading side is referred to as the first edge, and the edge on the cartridge side is referred to as the second edge. The edge of the second perforation of the next shooting frame on the leading side is referred to as the third edge and the edge on the cartridge side of the second perforation is referred to as the fourth edge.

Photosensor 7 is disposed such that each shooting frame is set on the predetermined shooting position when the fourth edge of the second perforation of each shooting frame reaches the position of photosensor 7. The position of photosensor 6 is determined such that the distance between photosensors 6 and 7 is longer than the distance from the front edge of the film to the notch 23.

FIGS. 2–6 are flow charts showing the process of the film feeding device in accordance with the invention.

Figure 2:
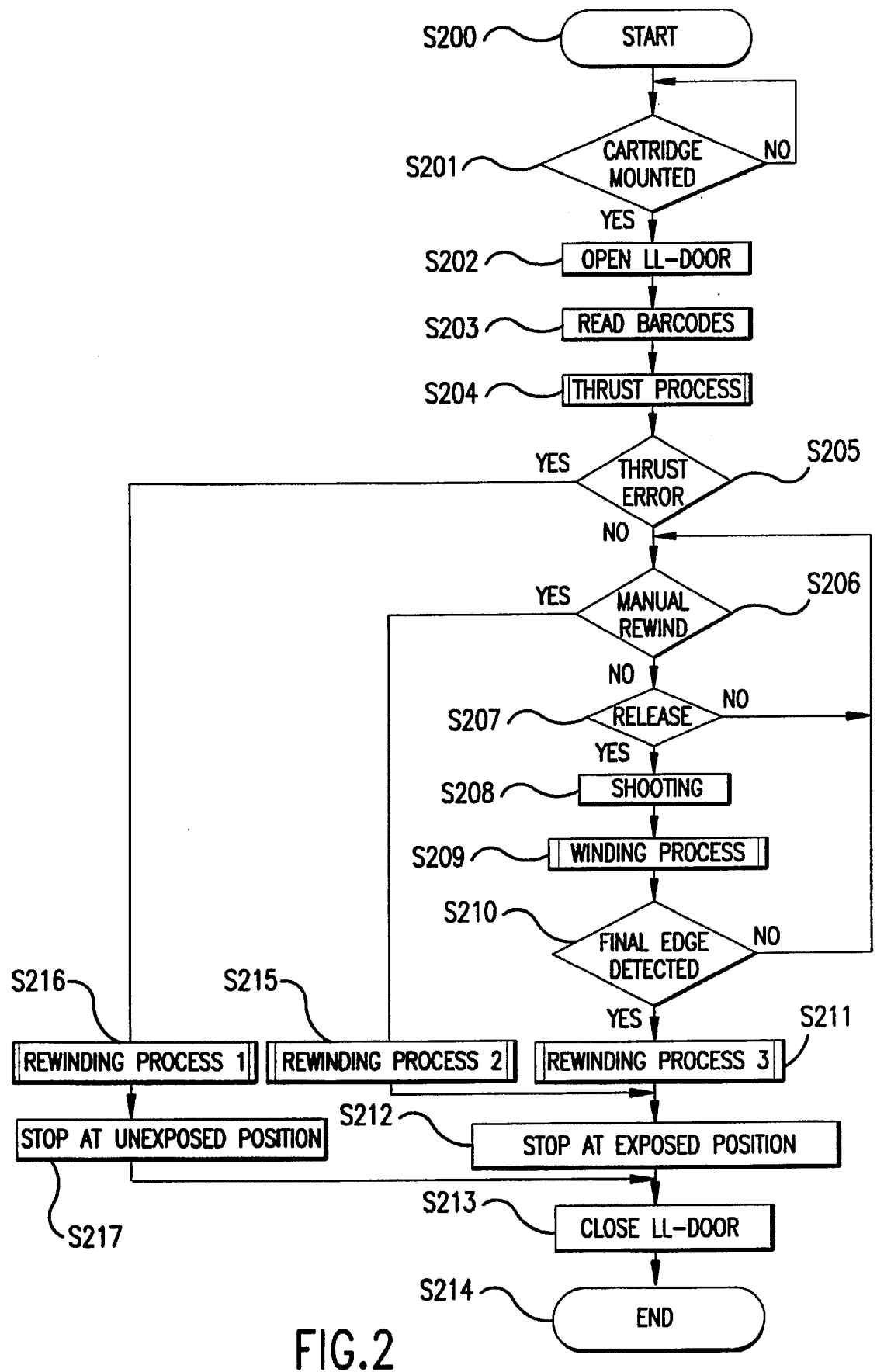
FIG. 2 is a flow chart showing a film feeding control process.

When the power of the camera is turned on, CPU 1 starts to execute the film feeding control program shown in FIG. 2. The program waits for the cartridge to be mounted in the camera at step 201. CPU 1 advances to step 202 when the cartridge is mounted and the switch 3 detects that the cartridge chamber lid is closed. At step 202, an opening/closing mechanism (not shown) is driven to open the LL-door of the film cartridge. At step 203, the motor driving circuit 8 is controlled to rotate the motor 9. Data on the data disk is read by rotating the data disk. In this case, rotating the data disk in the normal direction causes the film to advance from the cartridge. The film usage status is detected based upon the data that is read. If the film is unexposed, data such as the total number of frames of film is stored in RAM 1a.

Figure 3:
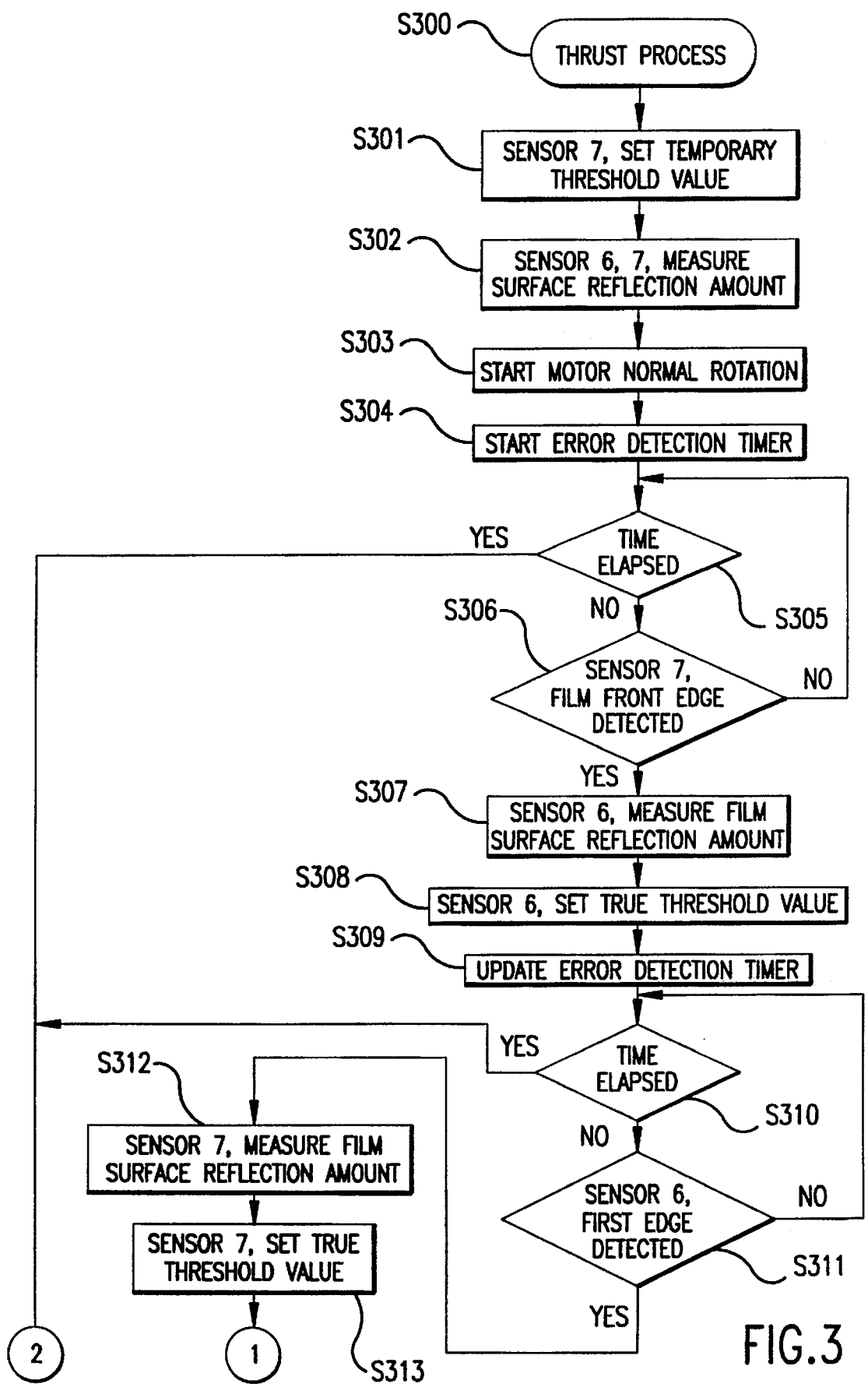
FIG. 3 is a flow chart showing a thrust process.
Figure 4:
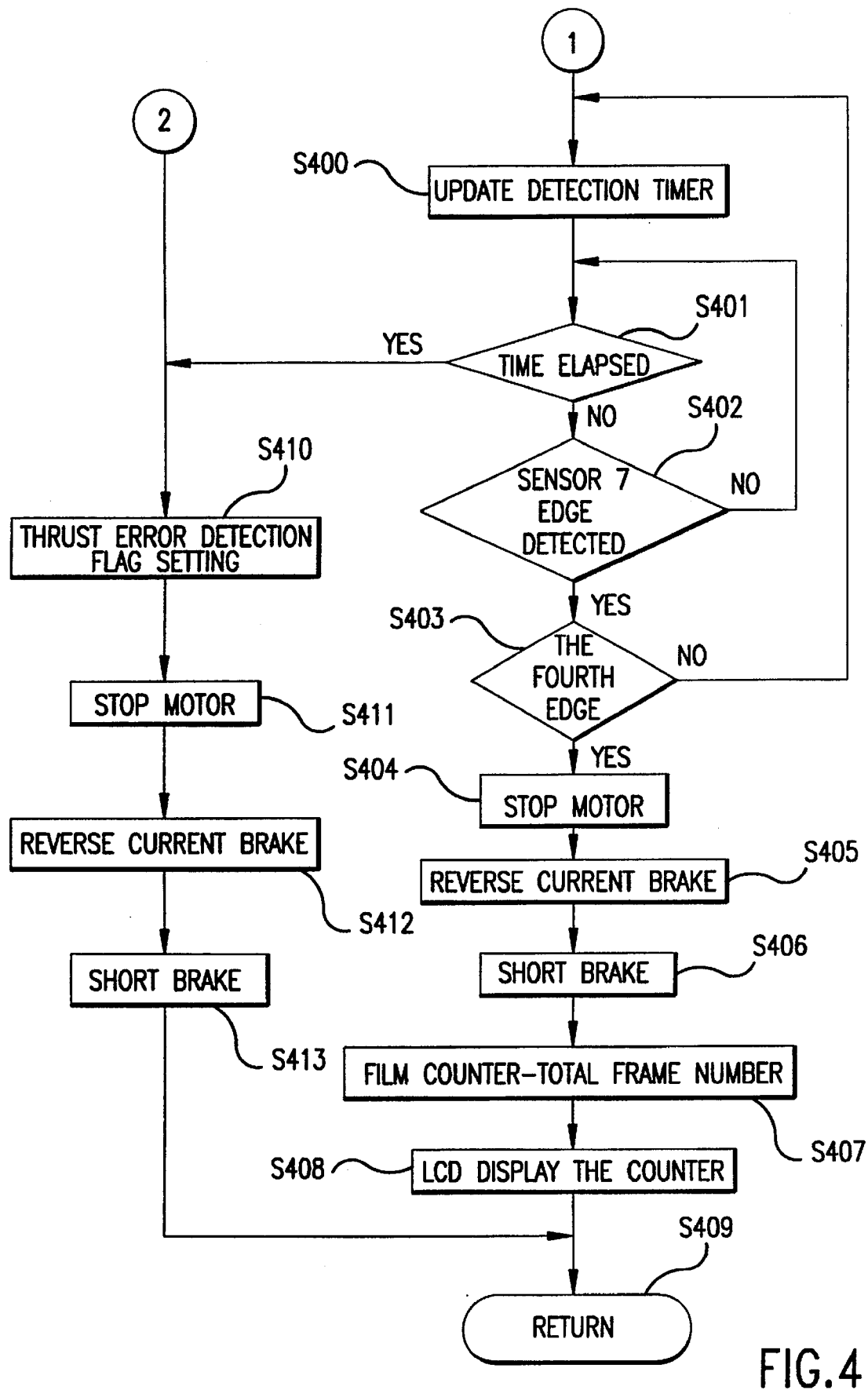
FIG. 4 is a flow chart that is a continuation of the flow chart of FIG. 3.

The program advances to step 204. In step 204, the thrust processing routine shown in FIGS. 3 and 4 is executed. In thrust processing, one situation arises where the first frame B1 of film is fed to the shooting position and the thrust operation is completed normally. Another situation arises wherein the thrust operation is interrupted because of an abnormality (hereinafter "thrust error") during thrust processing. In step 205, it is determined whether a thrust error occurred during thrust processing. The program advances to step 216 if a thrust error is detected. However, the program advances to step 206 if the thrust operation is completed normally.

Figure 6:
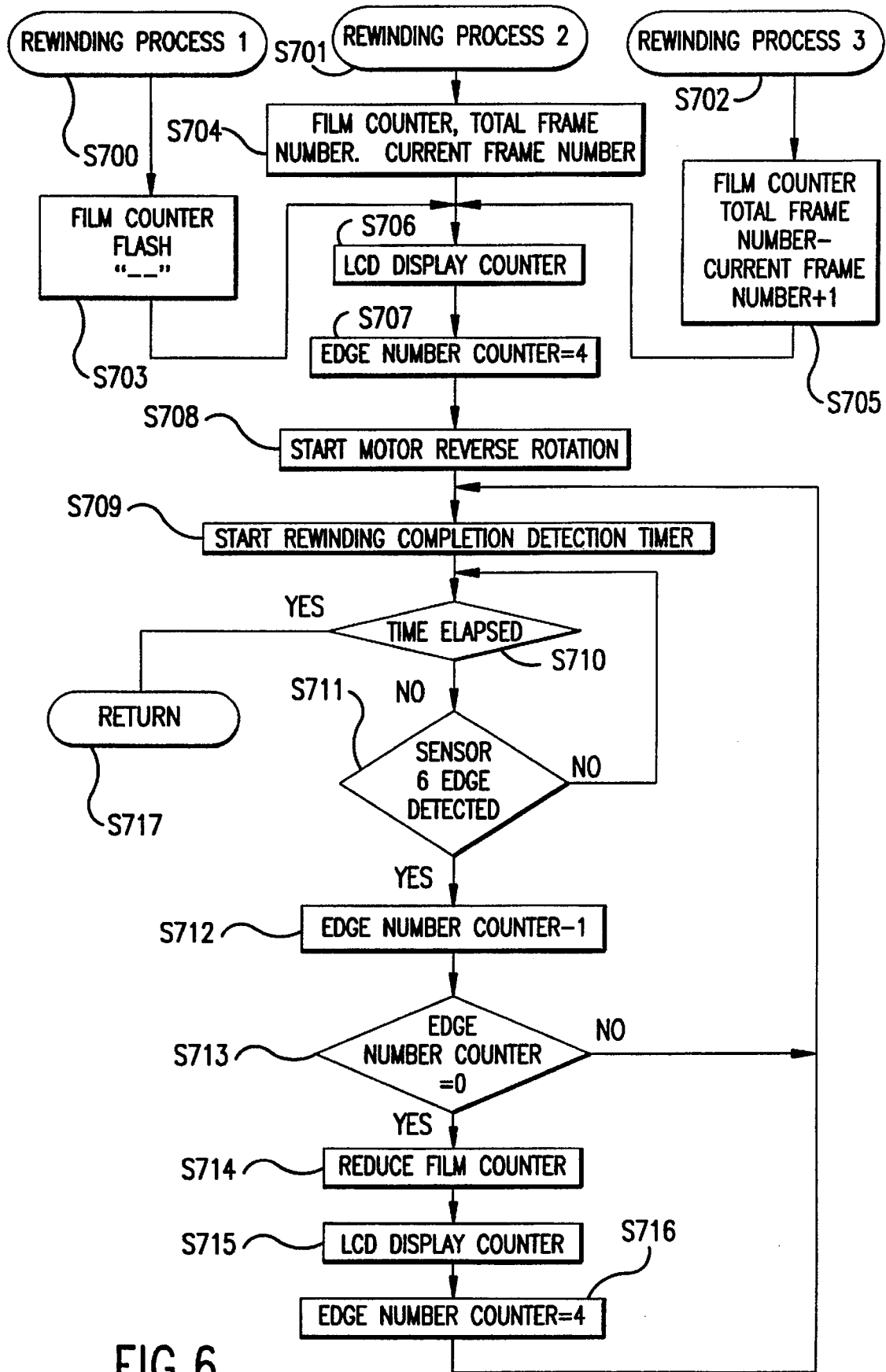
FIG. 6 is a flow chart showing a rewinding process.

If a thrust error is detected, the program executes, at step 216, a rewinding process 1 routine shown in FIG. 6 and rewinds the film. At step 217, the data disk stops at the unexposed position. The film is confirmed to be unexposed at step 203, and because of the thrust error, will be removed without shooting a single frame. Thus, the data disk is set at the unexposed position so that film can be mounted again to be used. The program advances to step 213, closes the LL-door and completes processing. A detailed explanation of how to stop the data disk at the unexposed position is omitted. However, the unexposed position of the data disk is detected by the signals from the sensor similarly to how data from the data disk was read at step 203. The data disk is set to the unexposed position by stopping the motor 9 utilizing predetermined signal timing.

If the thrust operation is completed normally, the first frame B1 is set to the predetermined shooting position. At step 206, a determination is made as to whether the manual rewind button is operated by the rewinding switch 5. The program advances to step 215 if the manual rewinding operation is not executed. Otherwise, the program advances to step 207.

At step 215, the program executes the rewinding process 2 routine shown in FIG. 6 to rewind the film manually. The program advances to step 212 to set the data disk to the already-exposed position. Therefore, the film is detected to be already exposed from the position of the data disk, even if the film is mounted on the camera again. This process prevents double exposure.

However, if the manual rewinding operation is not executed, the program advances to step 207. In step 207, it is determined whether the shutter is released by the switch 4. If the shutter is released, the program advances to step 208 and executes a series of shooting operations. Detailed explanation of the shooting operations is omitted. However, distance measurement and photometry are performed. Focus of the shooting lens is adjusted and the film is exposed based on the results of the distance measurement and photometry. A strobe light may be emitted depending on the results of photometry.

Upon completion of the shooting operations, the program advances to step 209. In step 209, the program executes the winding process routine shown in FIG. 5, and one frame of the film is wound. In the winding process, a situation arises wherein one frame of film is wound normally and the next frame is set on the shooting position. Another situation arises wherein the final edge of the film is reached during winding and winding is not completed. At step 210, it is determined whether the final edge of the film is detected during winding. If the final edge is not detected, the program returns to step 206 to execute the shooting operation described above for the next frame. However, if the final edge is detected, the program advances to step 211 to execute the rewinding process 3 routine shown in FIG. 6 and the film is rewound. At step 212, the data disk is set on the already-exposed position as explained above. Subsequently, at step 213, the LL-door is closed to complete the process.

The user opens the cartridge chamber lid and removes the film. The opening of the cartridge chamber lid is detected by the switch 3. Subsequently, the program returns to step 200 and waits for a new film cartridge to be mounted in the camera.

The thrust process is explained as shown in FIGS. 3 and 4.

During the thrust process, the LL-door of the cartridge is opened. The film is fed from the cartridge by rotating the cartridge spool in the normal direction. The leading section of the film winds around the winding spool of the camera. The film is wound until the first frame reaches the shooting position. Thus, the thrust process corresponds to a conventional empty feed process.

The threshold value is set to determine the output voltage based on the output voltage of photosensors 6 and 7. The amount of reflection of the film surface may differ depending on the type of emulsion used on the film and the output voltage of photosensors 6 and 7. The relative reflection amounts of the rail surface and the film surface are detected. The threshold value is determined based upon the relative reflection amounts. The film must be fed to the detection position of the photosensor in order to detect the reflection amount of the film surface by the photosensor. Thus, a temporary threshold value is set at the start of the thrust. Subsequent to the start of the thrust, feeding of the film to the position of the photosensor is detected by comparing the temporary threshold value with the output voltage of the sensor. The reflection amount of the film surface is detected. The threshold value is calculated based upon the reflection amount of the film surface and the reflection amount of the railsurface. The calculated threshold value becomes the real threshold value which replaces the temporary threshold value.

The program determines that the film is not fed and declares a thrust error if the signals input from the photosensors 6 and 7 do not reverse for longer than a predetermined time interval, e.g., eight seconds, in spite of electric current flowing through the motor 9. Thus, the program declares a thrust error if the perforation edge is not detected by photosensors 6 and 7.

FIG. 3 shows the process from the beginning of the thrust to establishment of threshold values by photosensors 6 and 7. FIG. 4 shows the subsequent process of feeding the first frame of the film to the shooting position subsequent to the establishment of threshold values.

At the beginning of the process at step 300, the motor 9 stops and the film 21 is disposed inside of the cartridge. At step 301, a temporary threshold value is set. The temporary threshold value is stored beforehand in the EEPROM (not shown) to determine the output voltage of photosensor 7. This threshold value detects when the front edge of the film 21 reaches photosensor 7. This temporary threshold value may be a fixed value, e.g., a value equivalent to ½ of the power source voltage to be stored in EEPROM during the manufacture of the camera. The temporary threshold value may also be an adjustable value recorded after each camera is adjusted. At step 302, output voltages of photosensors 6 and 7' that are equivalent to the reflection amount of the rail surface are read and stored in the RAM 1a of the CPU 1. At step 303, the motor starts rotating in the normal direction. At step 304, the thrust error detection timer starts after being set to eight seconds. The program executes a loop including steps 305 and 306.

If the thrust error detection time elapses at step 305, the program declares a thrust error and moves to step 410. At step 306, the output voltage of the photosensor 7 is compared with the temporary threshold value. The output voltage is higher than the threshold value when photosensor 7 receives the reflected light rays from the rail surface. When the program determines that photosensor 7 is facing the rail surface, the front edge of the film 21 has not yet reached the position of photosensor 7. The program subsequently returns to step 305. The output voltage is lower than the temporary threshold value when photosensor 7 faces the film surface and the reflection plate of the rail surface is shielded by the film. When the program determines that the front edge of the film has reached the position of the photosensor 7 it moves to step 307. The processing speed of CPU 1 as it repeats the processes of steps 305 and 306 is sufficiently fast relative to the film feeding speed, such that the process of detecting the front edge of the film by the photosensor 7 at step 306 is assumed to be executed continuously. Thus, the front edge of the film is detected immediately upon reaching the position of photosensor 7.

At step 307, the output voltage of photosensor 6 is read upon detecting the front edge of the film 21 by photosensor 7 at step 306. Photosensor 6 is arranged higher than photosensor 7 relative to the direction of the winding of the film, as shown in FIG. 12. The front edge of the film has already passed the detection position of photosensor 6. Photosensor 6 faces the film surface when the front edge of the film reaches photosensor 7. Therefore, the output voltage of photosensor 6, which is read at step 307, is equivalent to the reflection amount of the film surface.

At step 308, the real threshold value of photosensor 6 (hereinafter "the true threshold value") is determined based upon the output voltage of photosensor 6 equivalent to the reflection amount of the film surface as read at step 307, and the output voltage of the photosensor 6 equivalent to the rail surface as read at step 302. For the true threshold value, it is sufficient to set the value of the voltage between the voltage equivalent to the reflection amount of the film surface and the voltage equivalent to the reflection amount of the rail surface. The threshold value and the true threshold value should be established by applying weight coefficients to two voltages. The calculated true threshold value is stored in RAM 1a of CPU 1 and used until a new film cartridge is mounted on the camera and the thrust process is executed.

The film 21 continues to be fed. However, the threshold value setting process by CPU 1 is fully completed within several milliseconds. There is no danger of not detecting the edge of the next perforation even when the film continues to be fed. The threshold value of photosensor 6 is set after the beginning of the thrust. The need to set a temporary threshold value prior to the beginning of thrust is eliminated.

The program advances to step 309 upon completing the setting of the true threshold value of photosensor 6. The program starts the process again after setting eight seconds for the thrust error detection timer. The program executes a loop including steps 310 and 311. If the thrust error detection time elapses at step 310, the program determines that a thrust error has occurred and advances to step 410. At step 311, the output voltage of photosensor 6 is read and compared with the true threshold value established at step 308. If the output voltage is lower than the true threshold value, the program determines that photosensor 6 is facing the film surface and that the perforation has not yet reached the position of photosensor 6. The program returns to step 310. If the output voltage is higher than the true threshold value, the program determines that photosensor 6 is facing the rail surface and that the first edge of the first perforation has reached photosensor 6. The program advances to step 312 when photosensor 6 detects the first edge.

At step 312, the output voltage of photosensor 7 equivalent to the reflection amount of the film surface is read. The following discussion explains why the reflection amount of film surface is measured by the photosensor 7 after photosensor 6 detects the first edge of the first perforation.

A notch 23 is provided in the leading section of the film 21, as shown in FIG. 11. The notch 23 passes the detection positions of photosensors 6 and 7 since the photosensors 6 and 7 trace along the dashed line. The output voltage may be read accidently when the notch 23 is at photosensor 7 if the output voltage of photosensor 7 is read immediately after photosensor 7 detects the front edge of the film at step 306. This output voltage is not the voltage equivalent to the reflection amount of the film surface. Thus, calculating the true threshold value of photosensor 7 based upon the output voltage may result in poor accuracy in detecting perforation edges. However, when photosensor 6 detects the first edge of the first perforation, the notch 23 has already passed the detection position of photosensor 7. Thus, the voltage equivalent to the reflection amount of the film surface may be accurately measured.

At step 313, the true threshold value of photosensor 7 is determined based upon the output voltage of photosensor 7 equivalent to the reflection amount of the rail surface read at step 302, and upon the output voltage of the photosensor 7 equivalent to the film surface read at step 312. The method of setting the true threshold value of photosensor 7 is the same as for photosensor 6.

As with the true threshold value setting process of photosensor 6 described above, the film 21 continues to feed. However, the threshold value setting process by CPU 1 is fully completed within several milliseconds. Thus, there is no danger of missing the edge of the next perforation, even when the film continues to be fed.

The program executes a loop including steps 401 and 402 after setting eight seconds for the thrust error detection timer and starting the timer again. If the thrust error detection time elapses at step 401, the program determines that a thrust error has occurred and advances to step 410. At step 402, the output voltage of photosensor 7 is read and compared with the true threshold value established at step 313. If the output voltage is lower than the true threshold value, photosensor 7 is facing the film surface. However, if the output voltage is higher than the true threshold value, photosensor 7 is facing the rail surface through the perforation. At step 402, whether the result of discrimination during the previous reading is film surface or rail surface is stored. A determination is made as to whether the current discrimination result is different from the previous discrimination result. If it is the same, the program determines that the edge is not detected and returns to step 401. However, if it is different, the program determines that the edge is detected, and advances to step 403. At step 403, the number of edges is counted and the determination is made as to whether the edge detected this time is the fourth edge. If it is not the fourth edge, the program returns to step 400 and repeats the above process.

When the fourth edge is detected by photosensor 7, the program stops the motor 9 at step 404. At step 405, the motor 9 is reversed for a predetermined time interval, e.g., approximately five milliseconds, to apply reverse current braking. At step 406, a short brake is applied by shorting the motor 9 for a predetermined time interval, e.g., approximately 80 milliseconds. As a result, feeding of the film is completely stopped, and the first frame of the film 21 is set at the shooting position. At step 407, the total number of frames of film is set in the film counter of RAM 1a as the initial value of the number of shootable frames remaining. The number of frames read from the data disk at step 203 is set as the total number of frames. The program advances to step 408, where the total number of frames of film stored in the film counter of RAM 1a, i.e., the initial value of the number of shootable frames remaining, is displayed on the LCD 2. The program returns from step 409 to step 205.

However, if a thrust error is detected, the thrust error detection flag is set in RAM 1a of CPU 1 at step 410. The flag is an identification flag which indicates that a thrust error is detected during the thrust process. The determination described in above step 205 is executed based upon the flag. If the flag is set at step 410, the motor 9 is stopped at step 411, such as when winding is completed normally. At step 412, the motor 9 is reversed for a predetermined time interval, e.g., approximately five milliseconds to apply reverse current braking. At step 414, a short brake is applied by shorting the motor 9 for a predetermined time interval, e.g., approximately 80 milliseconds.

If a thrust error occurs, "E" is displayed on the film counter of LCD 2. This display provides a warning concerning the occurrence of the thrust error.

Subsequent to completion of the thrust process, the true threshold values calculated at steps 308 and 313 are stored in the EEPROM (not shown). This enables the true threshold values to be maintained until the next thrust process is executed. Thus, even if CPU 1 is reset, such as in the case of the battery falling off subsequent to the mounting of the film, normal film feeding is assured after the battery is re-installed.

Figure 5:
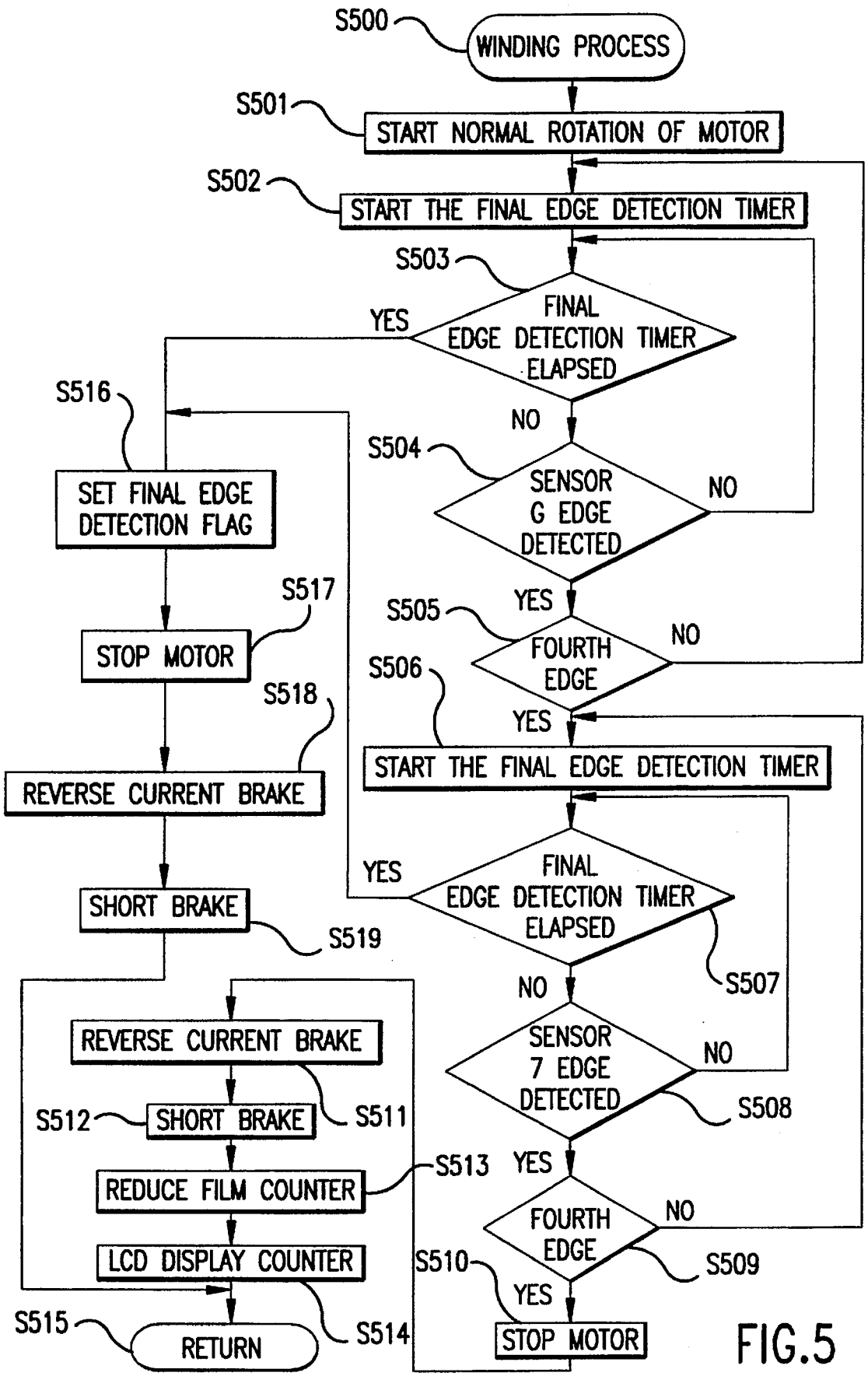
FIG. 5 is a flow chart showing a one frame winding process.

The process of winding one frame is shown in the flowchart of FIG. 5.

The process of winding one frame is a process wherein, subsequent to shooting a frame of film, the film is fed in order to set the next frame in the shooting position. The film 21 does not move if the perforation is not detected by photosensors 6 and 7 for a period longer than a predetermined time interval, e.g., two seconds, while one frame is being wound, even if electric current is running through the motor 9. This condition indicates that the film 21 is wound through the final edge.

After a frame is completely exposed in the shooting position, the winding process starts at step 500. Initially, the program advances to step 501 and feeds the film 21 in the direction of winding by starting the normal rotation of the motor 9. At step 502, two seconds is set in the final edge detection timer and the timer starts. The final edge detection timer detects the final edge of the film 21. The program executes a loop that includes steps 503 and 504. At step 503, if the final edge detection timer elapses, the program determines that the final edge of the film 21 has been reached and advances to step 516. At step 504, the program reads the output voltage of photosensor 6 and compares it with the thrust threshold value. If the output voltage is lower than the true threshold value, photosensor 6 is facing the film surface. However, if the output voltage is higher than the true threshold value, photosensor 6 is facing the rail surface through the perforation. At step 504, whether the discrimination result of the previous output is the film or rail surface is stored. A determination is made as to whether the current discrimination result is different from the previous discrimination result. If it is the same, the program determines that the edge is not detected and returns to step 503. If it is different, the program determines that the edge is detected and advances to step 505.

At step 505, a determination is made as to whether the edge detected is the fourth perforation. Since the edge detected by photosensor 6 immediately after one frame begins to be wound is the first edge, the program returns to step 502.

The program advances to step 505 when the winding of one frame advances and photosensor 6 detects the edge at step 504. After repeating this process, the program moves to step 506 if the fourth edge is detected at step 505.

At step 506, the final edge detection timer is set for two seconds and the timer starts again. Subsequently, the program executes a loop between steps 507 and 508.

If the final edge detection timer elapses at step 507, the program determines that the final edge of the film 21 is reached and advances to step 516. At step 508, the output voltage of photosensor 7 is read and compared with the true threshold value. If the output voltage is lower than the true threshold value, photosensor 7 is facing the film surface. However, if the output voltage is higher than the true threshold value, photosensor 7 is facing the rail surface through the perforation. At step 508, whether the discrimination result of the previous output voltage is the film or rail surface is stored. A determination is made as to whether the current discrimination result is same as the previous discrimination result. If it is the same, the program determines that the edge is not detected and returns to step 507. However, if it is different, the program determines that the edge is detected and advances to step 509. At step 509, the number of edge reversals is counted. The program returns to step 506 if the edge is not the fourth edge. The program returns to a loop including steps 507 and 508 after setting two seconds in the final edge detection timer and starting the timer again. At step 509, if the fourth edge is detected by photosensor 7, the next frame of film 21 has been fed to the shooting position. Thus, the program advances to step 510 to execute the halting process.

The motor 9 is stopped at step 510. At step 511, the reverse current brake is applied by reversing the motor 9 for a predetermined time interval, e.g., approximately five milliseconds. At step 512, a short brake is applied by shorting the motor 9 for a predetermined time interval, e.g., approximately 80 milliseconds. This process stops the film from feeding. The shooting face of the next frame is set on the shooting position.

At step 513, the number of shootable frames remaining in the film counter of RAM 1a is reduced by 1. The updated number of shootable frames remaining is displayed on LCD 2 at step 514. The program returns from step 515 to step 209.

The film stops feeding during the winding of one frame when photosensor 7 detects the fourth edge. Thus, the fourth edge of the second perforation of the next frame stops in the vicinity of photosensor 7. The film 21 may return, due to a backlash of the feeding mechanism, to a position where signals from photosensor 7 reverse. However, according to the present invention, only the output voltage of photosensor 6 is read when feeding starts. Thus, the edge is not detected accidentally when the next frame is fed, even if the film returns by backlash to a position where the signals from photosensor 7 reverse.

At step 516, the final edge detection flag is set in RAM 1a of CPU 1 when the final edge of the film 21 is detected. This flag is an identification flag indicating that the final edge of the film is detected during the winding of one frame. Discrimination at step 209 is executed based upon the flag. The program moves to step 517 and stops the motor 9 after setting the final edge detection flag. At step 518, reverse electric current braking is applied by reversing the motor 9 for a predetermined time interval, e.g., approximately five milliseconds. Subsequently, a short brake is applied by shorting the motor 9 for a predetermined time interval, e.g., approximately 80 milliseconds at step 519. This process stops the film from being fed. The program returns from step 515 to step 209. If the final edge is detected, the film counter in LCD 2 does not change. Thus, a user can recognize the winding of the film through the final edge.

The rewinding process is explained below using FIG. 6.

The program initiates the rewinding process 1 if a thrust error is detected during the thrust process. If the rewinding switch 5 detects the manual rewinding operation, the rewinding process 2 is initiated. The rewinding process 3 is called when the final edge is detected during the winding of one frame. Photosensor 6 is used for the movement of film during rewinding. Photosensor 7 has the same perforation detection function. Thus, photosensor 7 may be used for control. However, photosensor 6 is closer to the cartridge, as shown in FIG. 12. The output of signals ends after more film 21 is rewound into the cartridge. Thus, the use of photosensor 6 increases the reliability of the rewinding process.

When the rewinding process 1 is initiated, the process starts at step 700. At step 703, data is set to command flashing of "—" in the film counter on RAM 1a. Subsequently, the program advances to step 706.

When the rewinding process 2 is initiated, the process starts at step 701. At step 704, the current film counter value, i.e., the number of shootable frames remaining from RAM 1a and the total number of frames of film, i.e., the initial value for shootable frames remaining which is read from the data disk at step 203, are read. The number of frames already shot is calculated by subtracting the number of shootable frames remaining from the total number of frames of film. The calculated number of frames already shot is set in the film counter of RAM 1a as an initial value of the number of the frames to be rewound. The program advances to step 706.

When the rewinding process 3 is initiated, the process starts at step 702. At step 705, the current film counter value, i.e., the number of shootable frames remaining from RAM 1a and the total number of frames of film read from the data disk at step 203 are read. One is added to the difference between the number of shootable frames remaining and the total number of frames of film. The number of frames already shot is computed. The calculated number of frames already shot is set in the film counter of RAM 1a as an initial value of the number of frames remaining to be rewound. Subsequently, the program advances to step 706.

At step 706, the number of frames already shot, i.e., the initial value of the remaining frames to be rewound, which is set in the film counter of RAM 1a at either step 703, 704 or 705, is displayed on LCD 2. At step 707, the number 4 is set in the edge number counter which counts the number of reversal of the edge of photosensor 6. At step 708, reverse rotation of the motor 9 starts. At step 709, a predetermined time, e.g., eight seconds, is set for the rewinding completion detection timer and the timer is started. The film starts to rewind. The program executes a loop including steps 710 and 711. At step 711, the signals from photosensor 6 are read. The method of reading signals is the same as the method used at step 505 for the winding process. The program moves to step 712 and reduces the edge number counter by 1 when the reversal of the edge is detected at step 711. At step 713, a determination is made as to whether the edge number counter is 0. If it is not 0, the program returns to step 709, eight seconds is set for the rewinding completion detection timer and the timer starts again. The program returns to a loop that includes steps 710 and 711. If the edge number counter is found to be 0 at step 713, the program determines that the film is rewound by one frame, and reduces by one the number of frames to be rewound into the film counter of RAM 1a. The number of frames remaining to be rewound which is updated at step 715, is displayed on LCD 2. The number 4 is set in the edge number counter at step 716. The program returns to step 709.

The edge of photosensor 6 stops reversing after the rewinding progresses and the film is rewound to the leading section. The rewinding completion detection timer elapses when the edge does not reverse for eight seconds. The program moves from step 710 to step 717. Rewinding is completed at step 717.

After rewinding is completed, the program returns from step 212 to step 217 while electric current runs through motor 9 in the reverse direction. At either step 212 or step 217, the data disk is stopped at predetermined positions, such as the unexposed position, the already-exposed position, etc., by stopping the motor 9 after the sensor detects the position of the data disk. Thus, rewinding is completed while electric current continues to run through the motor 9 in the reverse direction.

In the embodiment described above, the number of frames already shot is calculated by subtracting the number of shootable frames remaining from the total number of frames prior to rewinding. In manual rewinding, i.e., steps 701–706 of FIG. 6, the calculated number of frames already shot is displayed as the initial value of the number of frames remaining to be rewound on LCD 2. In an alternative embodiment, the film counter value of RAM 1a, i.e., the number of shootable frames remaining, is reduced by one every time the winding of one frame is started. The number of frames already shot is calculated by subtracting the number of shootable frames remaining from the total number of frames prior to rewinding. The calculated number of shootable frames remaining is displayed on LCD 2 as the initial value of the number of remaining frames to be rewound in both the manual and automatic rewinding modes.

Thus, the film counter value of RAM 1a is already reduced by one and represents the correct number of shootable frames remaining, even when winding of one frame is not completed, the film is wound through the final edge. As with manual rewinding, the correct number of frames already shot is obtained by simply subtracting the film counter value in RAM 1a from the total number of frames. Thus, setting the film counter value during rewinding is executed the same way for both the manual and automatic rewinding modes.

Figure 8:
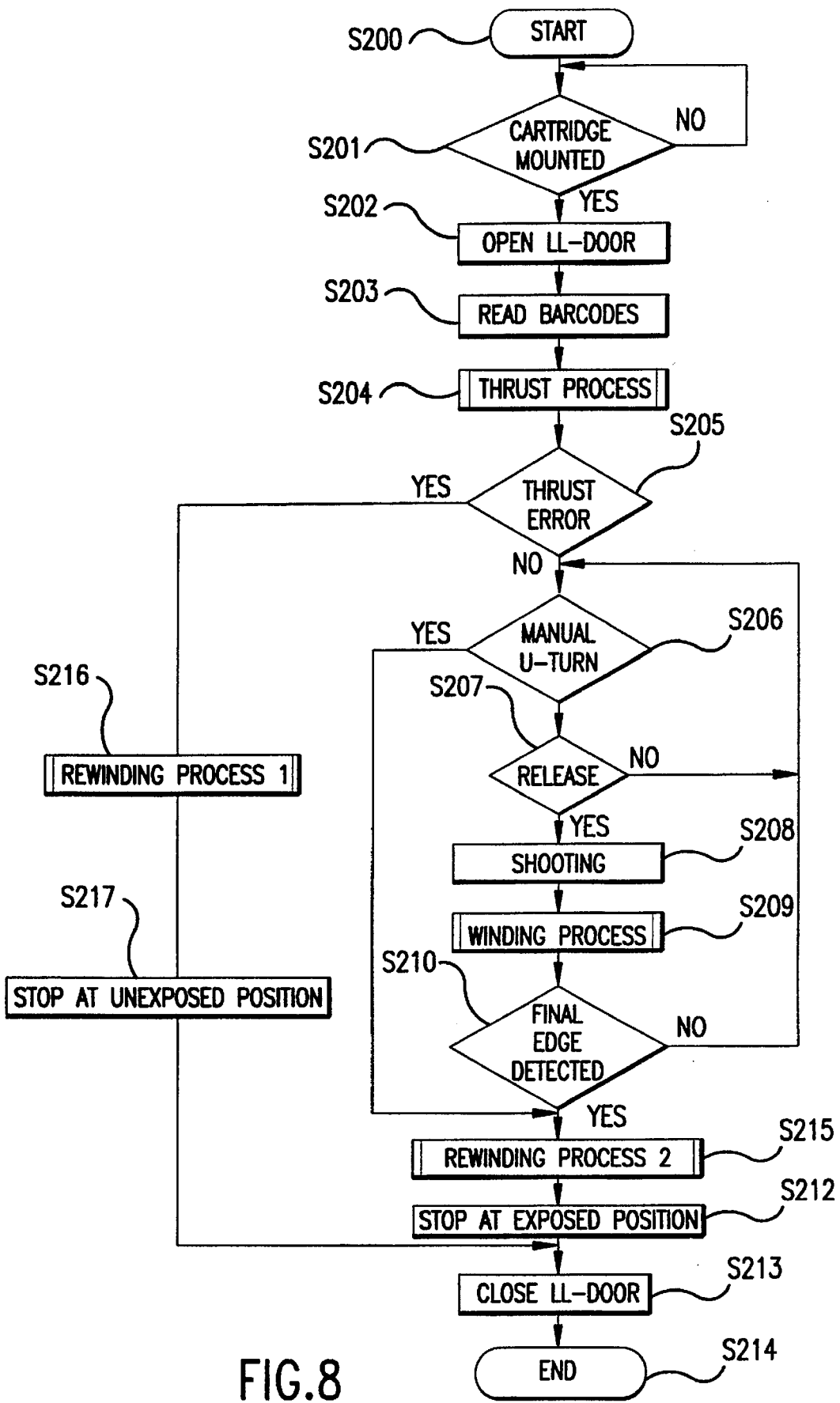
FIG. 8 is a flow chart showing a film feeding control process of another embodiment of the present invention.

FIG. 8 is a flow chart showing a film feeding process of an alternative embodiment. The steps which execute the same processes as the processes of the embodiment of FIG. 2 are denoted by the same step numbers. The following explanation focuses on the differences between the embodiments.

In the embodiment of FIG. 2, the rewinding process 3 is initiated at step 211 when the final edge of the film is detected at step 210. However, in the alternative embodiment, the program advances to step 215 when the final edge of the film is detected at step 210. The rewinding process 2 is initiated. The rewinding process 3 is not used in both situations when manual rewinding operation is executed and when the final edge of the film is detected.

Figure 9:
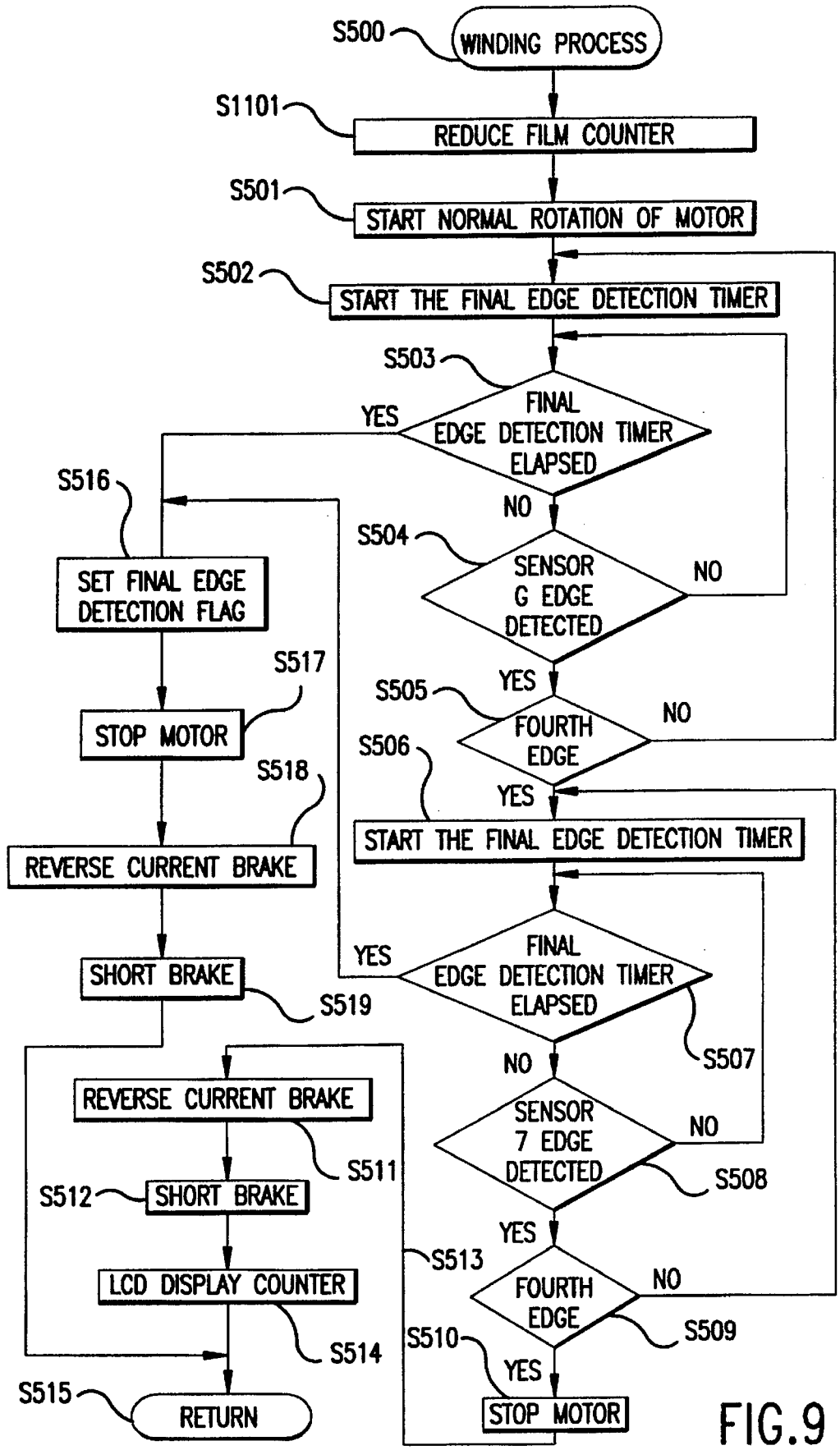
FIG. 9 is a flow chart showing a one frame winding process of another embodiment of the present invention.

FIG. 9 is a flow chart of an alternative embodiment of the one frame winding process. The steps which execute the same processes as the processes of the embodiment of FIG. 5 are denoted by the same step numbers. The following explanation focuses on the differences between the embodiments.

At step 1101, before one frame starts to be wound, the film counter value in RAM 1a, i.e., the number of shootable frames remaining, is reduced by one. The program advances to step 502 and the winding process begins as with the embodiment described above. The motor 9 is stopped at step 510 if winding is completed. The program advances from step 512 to 514. At step 514, the film counter value is displayed on LCD 2. The film counter in RAM 1a is reduced by one prior to winding one frame at step 1101. Thus, the counter value to be displayed on LCD 2 at step 514 is one less number of frames. The program returns from step 515 to step 210.

If the final edge detection flag is set at step 516, the process is completed in the same manner as the embodiment described above. However, the film counter in RAM 1a is already reduced by one at step 1101. Thus, the film counter in RAM 1a stores the value which is one less than the value in the embodiment described above when the program returns from step 515 to step 210.

Figure 10:
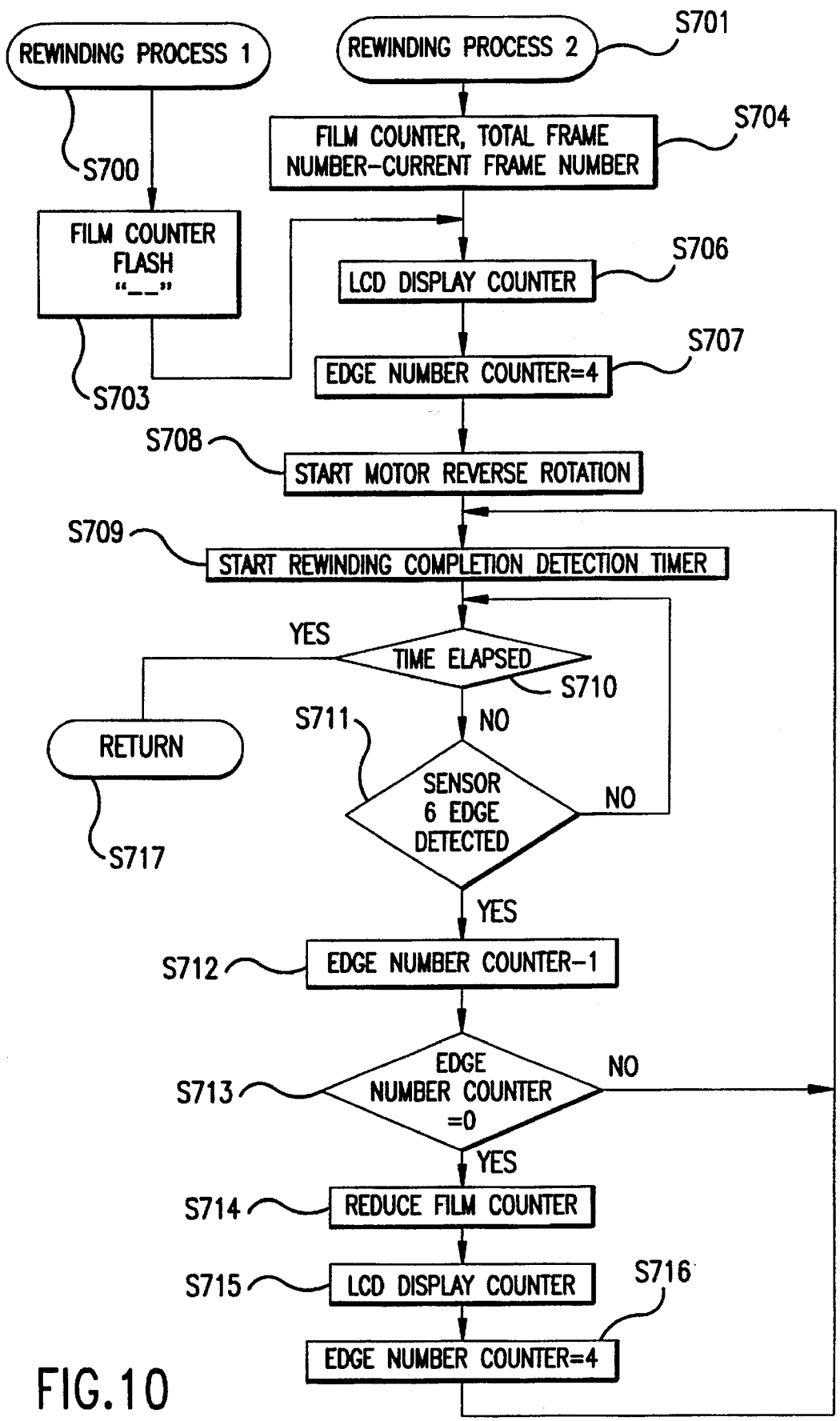
FIG. 10 is a flow chart showing a rewinding process of another embodiment of the present invention.

FIG. 10 is a flow chart showing an alternative embodiment of the rewinding process. The steps which execute the same processes as the processes in the embodiment of FIG. 6 are denoted by the same step numbers. The following explanation focuses on the differences between the embodiments.

In the alternative embodiment, the rewinding process 3 is eliminated from the rewinding process of the embodiment described above. When the rewinding process 2 is initiated upon detection of the final edge, the number of frames already shot is calculated by subtracting the film counter value, i.e., the number of shootable frames remaining, from the total number of frames of film. The calculated number of frames already shot is set for the film counter in RAM 1a as the initial value of the number of frames remaining to be rewound. This occurs because the film counter in RAM 1a already stores the value which is one less than the number stored in the embodiment described above at the time when the rewinding process is initiated.

Tongueless film is used for illustration in the embodiments described above. However, the present invention may be applied to conventional cameras using 135-type films. Instead of reading the total number of frames of film from the data disk, the DX code recorded on the cartridge surface of the 135-type film can be read to identify the total number of frames of film. The empty feeding process, the winding process and the rewinding process of the 135-type film are known and are not explained in detail.

In the embodiments described above, discrimination of signal reversal of photosensors 6 and 7 is only executed once. However, a reconfirmation process may be added by reading the same signal more than once by using a conventional signal noise elimination method.

Figure 7:
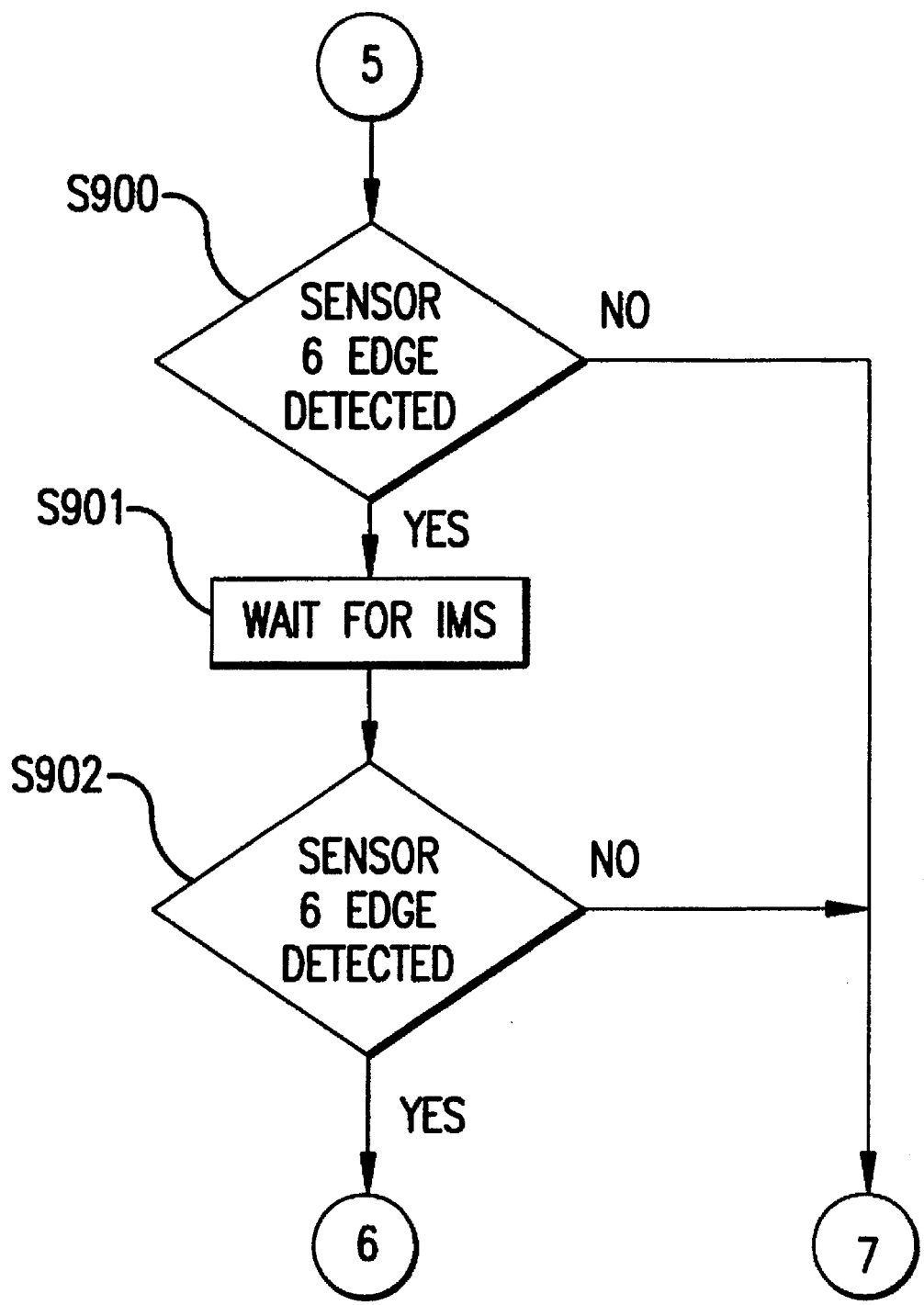
FIG. 7 is a flow chart showing a process to read the output from a photosensor two times.

A process of reading output signals from the photosensor twice is shown in FIG. 7. At step 504, the edge of the photosensor 6 is detected. However, the process of reading twice to eliminate signal noise may be executed by replacing step 504 with the process of FIG. 7. The program advances from step 503 to (5). If an edge reversal is not detected at step 900, the program advances to (7). If an edge reversal of the photosensor 6 is detected at step 900, the program waits for one millisecond at step 901 before confirming again the output from the photosensor at step 902. If the output signal is reversed, the program moves from (6) to step 505. If photosensor 6 does not detect the reversal at step 902, the program returns from (7) to step 503. The edge detection of the photosensors 6 and 7 for other timings is executed in the same manner. A process of reading twice may be implemented to read other switches by employing a similar structure.

In setting the signal level of the photo reflector, various methods may be used for setting the threshold values from the rail surface reflection amount and the film surface reflection amount read with the timing described in the above embodiments. The differences between such methods of computation do not limit the present invention.

A reflective photo reflector is used for photosensors to detect movement of the film during the thrust process, one frame winding process and rewinding process. However, a transmissive photo interrupter may be used instead.

In explaining the time interval for setting the timer, the actual numerical values are used in the embodiments described above. However, the present invention is not limited to these fixed values, and other values may be used to set the time interval.

In the embodiments described above, a reflection plate is attached on the film rail surface. The situation wherein the reflection amount of the rail surface is larger than the reflection amount of the film surface is explained above. However, the present invention may be applied to the situation wherein the rail surface is made a non-reflective surface and the reflection amount of the film surface is larger.

In the embodiment described above, CPU 1, the motor driving circuit 8 and the motor 9 function as the film feeding mechanism. CPU 1 and RAM 1a function as the frame number counting mechanism. CPU 1 functions as the initial value setting mechanism. LCD 2 functions as the display mechanism.

The present invention sets the total number of frames of film as the initial value for the number of shootable frames remaining after initial winding. The invention counts and displays the number of shootable frames remaining every time one frame is wound after shooting. The number of frames already shot is calculated using different methods for the manual and automatic rewinding modes. The calculated number of frames already shot is set as the initial value of the number of frames remaining to be rewound prior to rewinding. The number of frames remaining to be rewound is counted and displayed every time one frame is rewound. Thus, prior to rewinding via an automatic rewinding mode, the number of frames already shot is obtained by adding one to the difference between the number of shootable frames remaining and from the total number of frames of film. The calculated number of frames already shot is set as the initial value of the frames to be rewound. The number of frames remaining to be rewound is counted and displayed every time one frame is rewound with the automatic rewinding mode. Prior to rewinding with a manual rewinding mode, the number of frames already shot is obtained by subtracting the number of shootable frames remaining from the total number of frames of film. The calculated number of frames already shot is set as the initial value of the frames to be rewound. The number of frames remaining to be rewound is counted and displayed every time one frame is rewound with the manual rewinding mode. In this manner, a correct number of frames already shot is calculated for both the manual and automatic modes. The number of frames remaining to be rewound may thus be displayed accurately during rewinding.

After initial winding, the total number of frames of film is set as the initial value of the number of shootable frames remaining. The number of shootable frames remaining is counted and displayed every time one frame starts to be wound after shooting. Prior to rewinding with the manual or automatic rewinding mode, the number of frames already shot is calculated by subtracting the number of shootable frames remaining from the total number of frames of film. The calculated number of frames already shot is set as the initial value for the number of frames remaining to be rewound. The number of frames remaining to be rewound is counted and displayed every time one frame is rewound during rewinding. In this manner, the correct number of frames already shot is calculated using the same method for the manual and automatic rewinding modes. Thus, the number of frames remaining to be rewound is displayed accurately during rewinding.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A film feeding device of a camera, the film including a final edge and multiple frames including a first frame, the film at least partially housed in a film cartridge, comprising:

a film feeding means for providing an initial winding mode to feed film mounted in the camera and wind the first frame to a shooting position, a first frame winding mode to wind the film by one frame subsequent to shooting, a manual rewinding mode to rewind the film into the film cartridge when a rewinding operation member is operated, and an automatic rewinding mode to rewind the film into the cartridge when the film is rewound through the final edge during rewinding of the film by one frame;

a frame number counting means for counting a number of shootable frames remaining each time one frame is wound, and for counting a number of frames remaining to be rewound each time one frame is rewound;

an initial value setting means for setting a total number of frames of the film as an initial value of the number of shootable frames remaining for the frame number counting means subsequent to initial winding, and for setting concurrently the number of frames already shot as the initial value of a number of frames remaining to be rewound for the frame number counting means prior to rewinding; and a display means for displaying the frame number counted by the frame number counting means;

wherein the initial value setting means computes the number of frames already shot using different methods for the manual rewinding mode and for the automatic rewinding mode.

2. A film feeding device of a camera of claim 1 wherein the initial value setting means sets a value obtained by adding one to a difference between the number of shootable frames remaining counted by the frame number counting means and the total number of frames of film as the number of frames already shot prior to rewinding via the automatic rewinding mode.

3. A film feeding device of a camera of claim 1 wherein the initial value setting means sets a value obtained by subtracting the number of shootable frames remaining counted by the frame counting means from the total number of frames of film as the number of frames already shot prior to the rewinding via the manual rewinding mode.

4. A film feeding device of a camera, the film including a final edge and multiple frames including a first frame, the film at least partially housed in a film cartridge, comprising:

a film feeding means for providing an initial winding mode to feed film mounted in the camera and wind the first frame to a shooting position, a first frame winding mode to wind the film by one frame subsequent to shooting, a manual rewinding mode to rewind the film into the film cartridge when a rewinding operation member is operated, and an automatic rewinding mode to rewind the film into the cartridge when the film is rewound through the final edge during rewinding of the film by one frame;

a frame number counting means for counting a number of shootable frames remaining each time one frame starts to be wound and for counting a number of frames remaining to be rewound each time one frame is rewound;

an initial value setting means for setting a total number of frames of film as an initial value of the number of shootable frames remaining for the frame number counting means subsequent to initial winding, and for setting concurrently the number of frames already shot as the initial value of a number of frames remaining to be rewound for the frame number counting means prior to rewinding; and a display means for displaying the frame number counted by the frame number counting means;

wherein, the initial value setting means sets a number obtained by subtracting the number of shootable frames remaining counted by the frame number counting means from the total number of frames of film as the number of frames already shot prior to rewinding by one of the group consisting of the manual rewinding mode and the automatic rewinding mode.

5. A film feeding device of a camera, the film including a final edge and multiple frames including a first frame, the film at least partially housed in a film cartridge, comprising:

a film feeding mechanism having an initial winding mode to feed film mounted in the camera and wind the first frame to a shooting position, a first frame winding mode to wind the film by one frame subsequent to shooting, a manual rewinding mode to rewind the film into the film cartridge when a rewinding operation member is operated, and an automatic rewinding mode to rewind the film into the cartridge when the film is rewound through the final edge during rewinding of the film by one frame;

a frame number counting mechanism which counts a number of shootable frames remaining each time one frame is wound, and which counts a number of frames remaining to be rewound each time one frame is rewound;

an initial value setting mechanism which sets a total number of frames of the film as an initial value of the number of shootable frames remaining for the frame number counting mechanism subsequent to initial winding, and which sets concurrently the number of frames already shot as the initial value of a number of frames remaining to be rewound for the frame number counting mechanism prior to rewinding; and a display which displays the frame number counted by the frame number counting mechanism;

wherein the initial value setting mechanism computes the number of frames already shot using different methods for the manual rewinding mode and for the automatic rewinding mode.

6. A film feeding device of a camera of claim 5 wherein the initial value setting mechanism sets a value obtained by adding one to a difference between the number of shootable frames remaining counted by the frame number counting mechanism and the total number of frames of film as the number of frames already shot prior to rewinding via the automatic rewinding mode.

7. A film feeding device of a camera of claim 5 wherein the initial value setting mechanism sets a value obtained by subtracting the number of shootable frames remaining counted by the frame counting mechanism from the total number of frames of film as the number of frames already shot prior to the rewinding via the manual rewinding mode.

8. A film feeding device of a camera, the film including a final edge and multiple frames including a first frame, the film at least partially housed in a film cartridge, comprising:

a film feeding mechanism which has an initial winding mode to feed film mounted in the camera and wind the first frame to a shooting position, a first frame winding mode to wind the film by one frame subsequent to shooting, a manual rewinding mode to rewind the film into the film cartridge when a rewinding operation member is operated, and an automatic rewinding mode to rewind the film into the cartridge when the film is rewound through the final edge during rewinding of the film by one frame;

a frame number counting mechanism which counts a number of shootable frames remaining each time one frame starts to be wound and which counts a number of frames remaining to be rewound each time one frame is rewound;

an initial value setting mechanism which sets a total number of frames of film as an initial value of the number of shootable frames remaining for the frame number counting mechanism subsequent to initial winding, and which sets concurrently the number of frames already shot as the initial value of a number of frames remaining to be rewound for the frame number counting mechanism prior to rewinding; and a display which displays the frame number counted by the frame number counting mechanism;

wherein, the initial value setting mechanism sets a number obtained by subtracting the number of shootable frames remaining counted by the frame number counting mechanism from the total number of frames of film as the number of frames already shot prior to rewinding by one of the group consisting of the manual rewinding mode and the automatic rewinding mode.

9. A method of feeding film for a camera, the film including a final edge and multiple frames including a first frame, the film at least partially housed in a film cartridge, comprising the steps of:

providing an initial winding mode to feed film mounted in the camera and wind the first frame to a shooting position, a first frame winding mode to wind the film by one frame subsequent to shooting, a manual rewinding mode to rewind the film into the film cartridge when a rewinding operation member is operated, and an automatic rewinding mode to rewind the film into the cartridge when the film is rewound through the final edge during rewinding of the film by one frame;

counting a number of shootable frames remaining each time one frame is wound, and counting a number of frames remaining to be rewound each time one frame is rewound;

setting a total number of frames of the film as an initial value of the number of shootable frames remaining subsequent to initial winding, and setting concurrently the number of frames already shot as the initial value of a number of frames remaining to be rewound prior to rewinding; and displaying the frame number counted; and computing the number of frames already shot using different methods for the manual rewinding mode and for the automatic rewinding mode.

10. A method of feeding film of claim 9, further including the step of setting a value obtained by adding one to a difference between the counted number of shootable frames remaining and the total number of frames of film as the number of frames already shot prior to rewinding via the automatic rewinding mode.

11. A method of feeding film of claim 9, further including a step of setting a value obtained by subtracting the counted number of shootable frames remaining from the total number of frames of film as the number of frames already shot prior to the rewinding via the manual rewinding mode.

12. A method of feeding film for a camera, the film including a final edge and multiple frames including a first frame, the film at least partially housed in a film cartridge, comprising the steps of:

providing an initial winding mode to feed film mounted in the camera and wind the first frame to a shooting position, a first frame winding mode to wind the film by one frame subsequent to shooting, a manual rewinding mode to rewind the film into the film cartridge when a rewinding operation member is operated, and an automatic rewinding mode to rewind the film into the cartridge when the film is rewound through the final edge during rewinding of the film by one frame;

counting a number of shootable frames remaining each time one frame starts to be wound and counting a number of frames remaining to be rewound each time one frame is rewound;

setting a total number of frames of film as an initial value of the number of shootable frames remaining subsequent to initial winding, and setting concurrently the number of frames already shot as the initial value of a number of frames remaining to be rewound prior to rewinding; and displaying the frame number counted; and setting a number obtained by subtracting the counted number of shootable frames remaining from the total number of frames of film as the number of frames already shot prior to rewinding by one of the group consisting of the manual rewinding mode and the automatic rewinding mode.

* * * * *